April 23, 1963

R. F. GOOD ET AL 3,086,210

APPARATUS FOR MAKING STRUCTURAL FRAMES

Filed Jan. 15, 1962

INVENTORS
ROMER F. GOOD
ALOIS A. MAUSER

BY *Cumpston & Shaw*

ATTORNEYS

INVENTORS
ROMER F. GOOD
ALOIS A. MAUSER
BY Cumpston + Shaw
ATTORNEYS

INVENTORS
ROMER F. GOOD
ALOIS A. MAUSER
BY  *Cumpston & Shaw*
ATTORNEYS

April 23, 1963 R. F. GOOD ETAL 3,086,210
APPARATUS FOR MAKING STRUCTURAL FRAMES
Filed Jan. 15, 1962 7 Sheets-Sheet 4

INVENTORS
ROMER F. GOOD
ALOIS A. MAUSER
BY *Cumpston & Shaw*
ATTORNEYS

FIG. 7A

INVENTORS
ROMER F. GOOD
ALOIS A. MAUSER
BY
Cumpston & Shaw
ATTORNEYS

INVENTORS
ROMER F. GOOD
ALOIS A. MAUSER
BY
ATTORNEYS

April 23, 1963 R. F. GOOD ETAL 3,086,210
APPARATUS FOR MAKING STRUCTURAL FRAMES
Filed Jan. 15, 1962 7 Sheets-Sheet 7

FIG. 16

INVENTORS
ROMER F. GOOD
BY ALOIS A. MAUSER

ATTORNEYS

_United States Patent Office_ 3,086,210
Patented Apr. 23, 1963

3,086,210
APPARATUS FOR MAKING STRUCTURAL FRAMES
Romer F. Good, Brighton, and Alois A. Mauser, Irondequoit, N.Y., assignors to Morgan Machine Company, Inc., Rochester, N.Y., a corporation of New York
Filed Jan. 15, 1962, Ser. No. 166,260
14 Claims. (Cl. 1—149)

This invention relates to apparatus for assembling and nailing or otherwise fastening together the preformed component elements of structural frames such, for example, as wall and ceiling frames for prefabricated housing, one object of the invention being to provide new and improved apparatus of this nature operating more rapidly and efficiently in accomplishing mass production of such frames.

Another object is the provision of such an apparatus by which the several operations of assembling and fastening the components are performed more automatically and completely by power operated means actuated by remote control devices.

Another object is to supply an apparatus of this character having provisions for adjusting its parts for operation on frames of different sizes and shapes.

A further object is the provision of such an apparatus having power operated means for moving and guiding the frame progressively to positions for the successive assembly of components until completed.

Still a further object is to provide an apparatus having the above advantages in a construction which is practical in character and convenient to operate.

To these and other ends the invention resides in certain improvements and combinations of parts, all as will be hereinafter more fully described, the novel features being pointed out in the claims at the end of the specification.

In the drawings:

FIG. 7-A is a top view of the stop and clamp parts shown in FIGS. 6 and 7 for holding the structural members;

Figure 1:
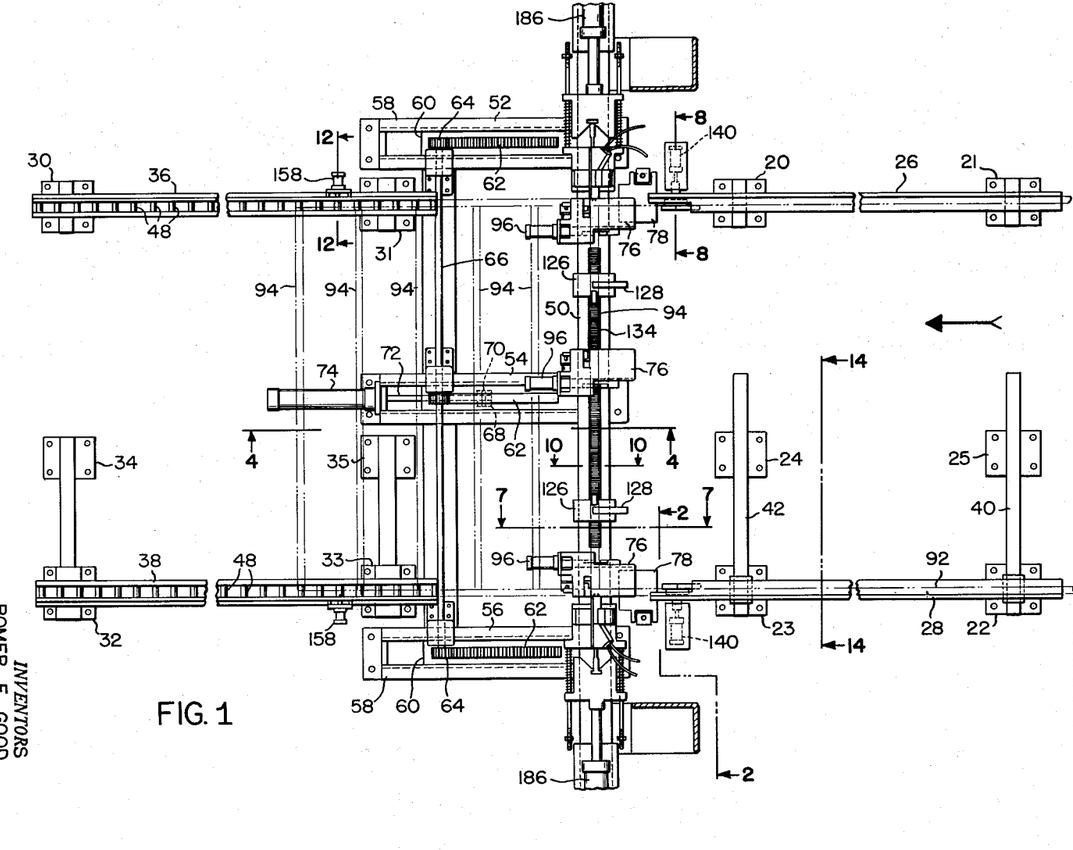
FIG. 1 is a top plan view, partly broken away, of an apparatus embodying the present invention with the parts in position for the reception of the frame components.
Figure 8:
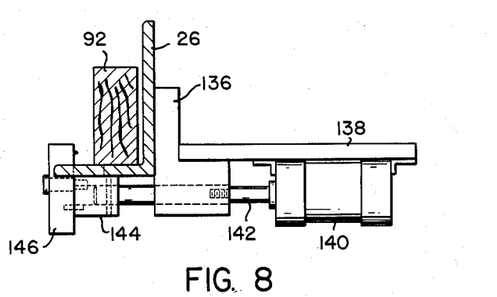
FIG. 8 is an enlarged, sectional elevation on the line 8—8 in FIG. 1 showing means for clamping the frame components.

The present embodiment of the invention, adapted for assembling and uniting the component elements of wall and ceiling frames for prefabricated housing, comprises pedestal supporting means fixed on a floor, including supports for the guideways for frame components and also supports for a reciprocating carriage for some of the operating parts. The forward supporting means for the elongated frame components or plates comprises a forward set of pedestals or base plates 20 to 25, inclusive, bolted to the floor (FIG. 1) and supporting a pair of spaced parallel guideways, such as structural L beams 26 and 28 (FIGS. 1 and 8). A rearwardly spaced supporting means for the same components comprises a set of footings 30 to 35, inclusive, for a pair of spaced parallel guideways 36 and 38. The forward guideways, 26 and 28, are separated from the rearward set of guideways 36 and 38 to leave space between their adjacent ends for the reciprocating movement of the transversely extending carriage hereafter described, in alignment with the directions of said guideways.

Figure 12:
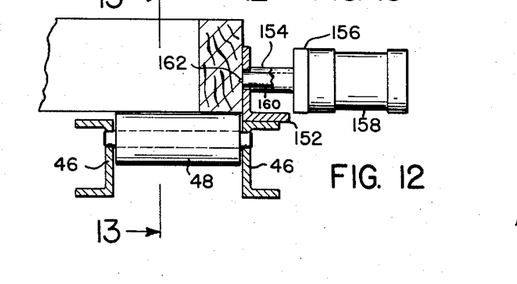
FIG. 12 is an enlarged sectional elevation on the line 12—12 in FIG. 1 showing means for releasably anchoring the frame on the supporting means.
Figure 13:
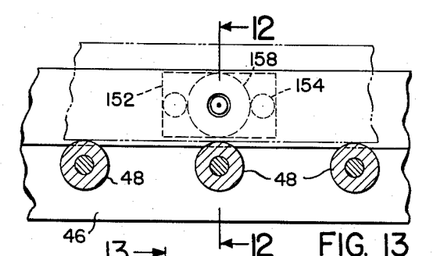
FIG. 13 is a sectional elevation on the line 13—13 in FIG. 12.
Figure 14:
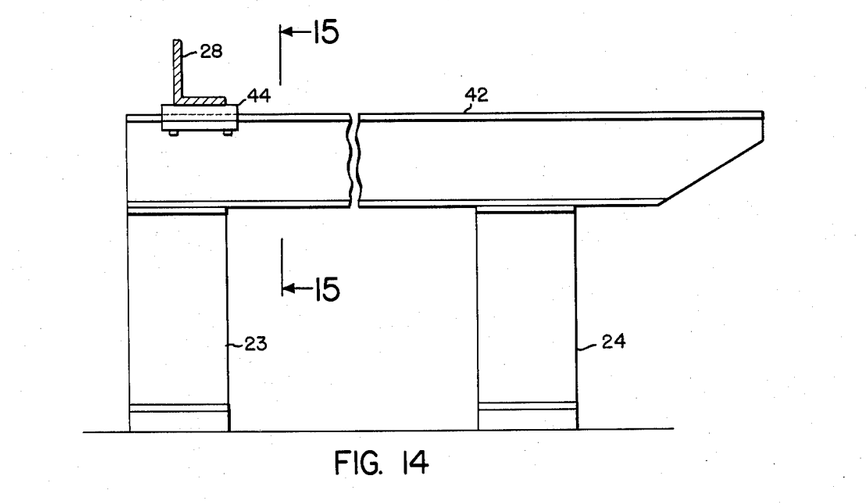
FIG. 14 is an enlarged, sectional elevation on the line 14—14 in FIG. 1 showing an adjustable guideway for the frame components.
Figure 15:
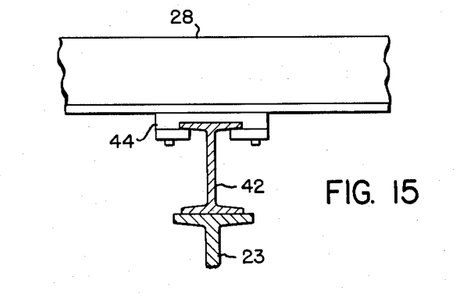
FIG. 15 is a sectional elevation on the line 15—15 in FIG. 14.

Means are provided for effecting relative movement of the guideways of each pair toward and from each other on their supporting pedestals, comprising an I beam 40 (FIGS. 14, 15) mounted on the pedestals 22 and 25 and a spaced and parallel I beam 42 on the pedestals 23 and 24. Guideway 28 for one frame component is slidably mounted on the beams 40 and 42 as by means of a gib type attachment 44 (FIGS. 14, 15) for adjusting guideway 28 toward and from guideway 26 to accommodate frames having differently spaced top and bottom plates. The rear guideways 36 and 38 are similarly supported for similar adjustment in alignment with the guideways 26 and 28, respectively, except that these guideways for supporting the assembled portion of the frame are constructed with spaced channels 46 (FIGS. 12, 13) having journalled therein the trunnions of bearing rollers 48 for reducing the frictional resistance to movement of the structural frame.

Figure 4:
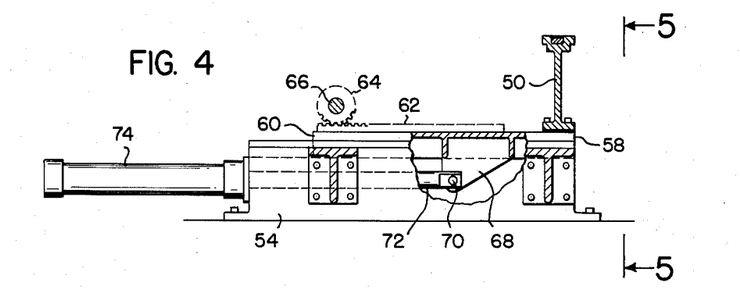
FIG. 4 is an enlarged elevation on the line 4—4 in FIG. 1 showing the means for moving the carriage beam.
Figures 5, 11:
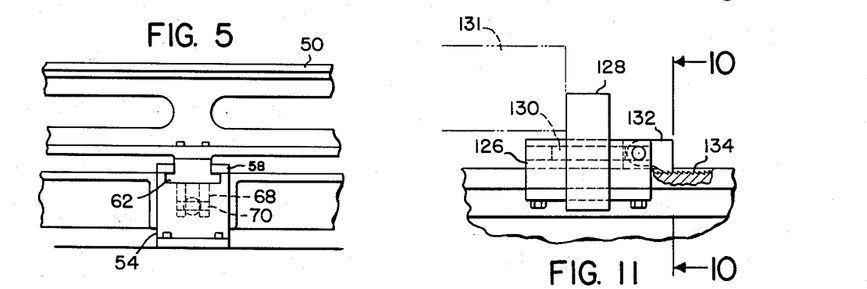
FIG. 5 is a fragmentary elevation on the line 5—5 in FIG. 4 showing means for supporting the carriage beam.
FIG. 11 is a fragmentary elevation of parts as seen from the left in FIG. 10.

The carriage for receiving, positioning, levelling, straightening and clamping the transverse frame components or studs comprises an I beam 50 supported for movement laterally on three elongated pedestals, 52, 54 and 56 (FIGS. 1, 4 and 5). Each pedestal is formed with a gib type bearing 58 (FIG. 5) for an elongated plate 60 having the carrier beam 50 fixed on one end thereof. Each plate 60 has fixed thereon a rack 62 (FIGS. 1, 4) meshing with a pinion 64 fixed on a shaft 66, to insure uniform movement of the slides 60. The central slide 60 is formed with depending flanges 68 pivotally connected by means of a pin 70 with the end of a rod 72 sliding in a cylinder 74 fixed to one end of the central pedestal 54. As fluid under pressure is admitted to one end or the other of cylinder 74 and exhausted from its opposite end, the slides 60 are uniformly advanced or retracted to move carriage beam 50 backwardly and forwardly in alignment with the guides for the longitudinal frame components, to produce a step by step advancing movement of the longitudinal frame components or plates as the transverse components or studs are succesively fastened thereto.

Figure 6:
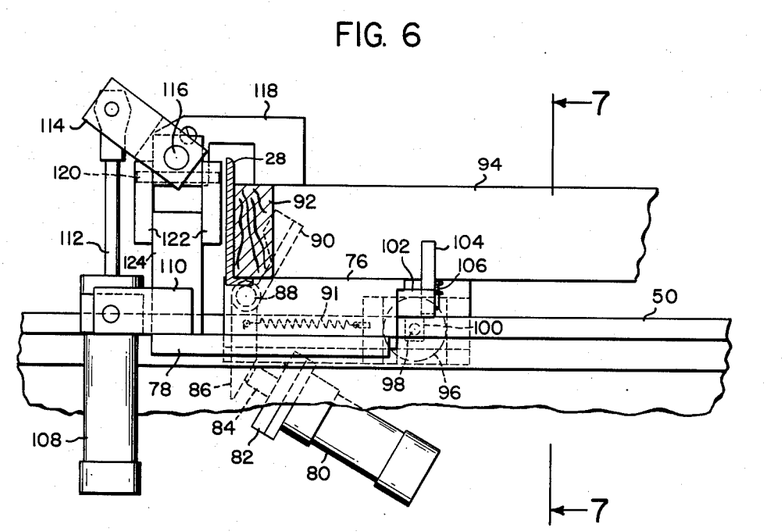
FIG. 6 is an enlarged, sectional elevation, partly broken away, on the line 2—2 in FIG. 1 showing positioning, levelling and clamping means on the carriage beam for the frame components.
Figure 7:
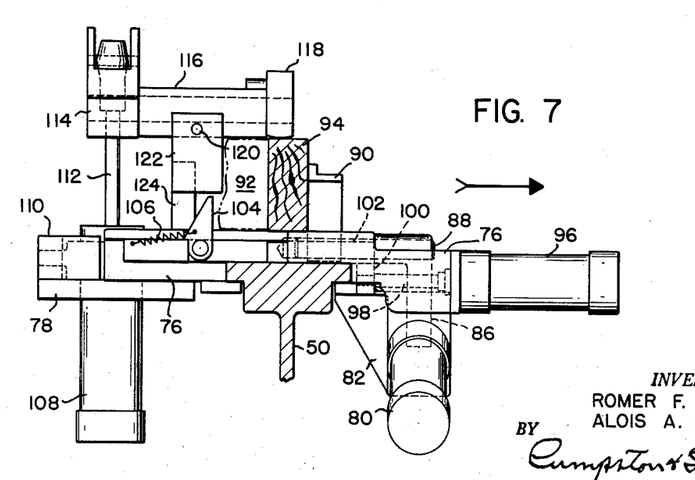
FIG. 7 is a sectional elevation on the line 7—7 in FIG. 6.

The carriage beam 50 is provided, adjacent each end and its center, with means for positioning, levelling, straightening and clamping the frame components preliminary to the nailing of the same together, as hereafter described. For this purpose the carriage beam has slidably mounted thereon, at each location, a casting 76 (FIGS. 1, 6 and 7) of irregular shape and having a plate 78 fixed to its lower side. Casting 76 has a gib type bearing on the top flange of the carrier beam 50 (FIG. 7) for adjustment of the casting along the beam. A cylinder 80 fixed to a flange 82 of the casting has its piston rod 84 in engagement with an arm 86 fixed on a short spindle 88 journalled in the casting and having fixed thereon also a gauge or stop 90 adapted to be swung by a tension spring 91 across the path of an elongated frame component or plate 92 advanced along a guideway, as 28, to locate the plate in position for attachment of the first transverse component or frame stud 94 (FIGS. 6, 7 and 7-A).

Fixed on one end of each casting 76 is a cylinder 96 having its piston rod 98 connected to a depending flange 100 of a plate 102 sliding in a guideway in the casting and having pivoted thereon a clamping dog 104. A spring 106 connecting the dog and plate holds a shoulder on the dog in contact with a shoulder on the plate so that retraction of its cylinder piston 98 moves the plate to bring the dog against a frame stud 94 positioned on the carriage against stop 90, thus clamping the stud in position.

Figure 7A:
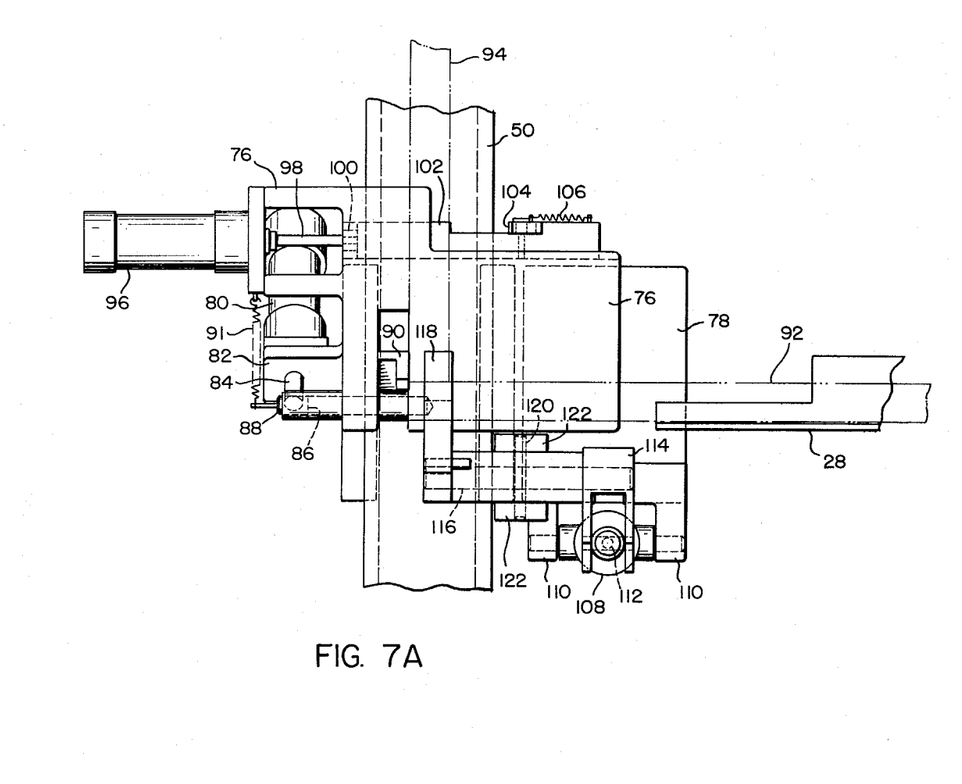

Casting 76 has fixed thereon also a cylinder 108 (FIGS. 6 and 7) as by means of brackets 110, and the cylinder piston 112 is pivotally connected with an arm 114 fixed on a short spindle 116 having fixed thereon also a component levelling arm 118 adapted to span the upper edges of both a plate and a stud component (FIGS. 6, 7 and 7-A), for levelling them with each other. Arm 118 is pivotally mounted on a short spindle 120 journalled at its ends in spaced arms 122 fixed on a bracket 124 fixed in turn on the casting plate 78. Actuation of cylinder 108 thus serves to press both a plate and stud down upon casting 76 so as to bring them to a common level.

It is apparent from the above description that the piston of cylinder 80 may be retracted to permit spring 91 to swing the stop or gauge 90 across the path of a plate, as 92, on the guideway 28. The plate may then be advanced along the guideway until stopped by the gauge in position for attachment of the first transverse component or stud. A stud is then laid on the casting against the stop 90 and in abutting relation with the plate (FIGS. 6, 7 and 7-A). Cylinder 108 may then be actuated to level and hold the plate and stud. Cylinder 96 is then actuated to retract its piston and bring dog 104 into engagement with the opposite side of the stud to further clamp it in position again stop 90 for nailing the components together. These positioning and clamping devices are the same on both ends of the carriage beam and also in part at its center, so that a stud is clamped and straightened at both ends and its center.

Figure 10:
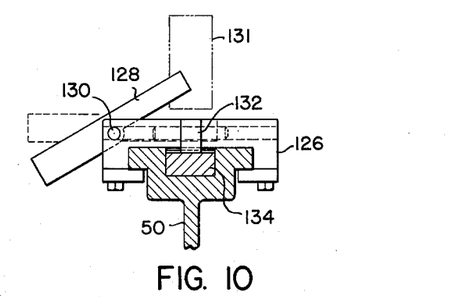
FIG. 10 is an enlarged sectional elevation on the line 11—11 in FIG. 1 showing back-up means for holding frame components of reduced length.

Means are provided for assembling studs of reduced length as required where a window frame or the like is to be included at an intermediate portion of a frame and for this purpose the carriage beam is provided, between the above described clamping castings and their parts, with a pair of shoes 126 (FIGS. 10 and 11) having a gib type bearing slidably engaging the top flange of the carrier beam 50. A dog 128 pivoted on the shoe at 130 is adapted to be swung to a position (FIG. 10) in which an elevated end is brought into abutting relation with a short stud 131 having its other end clamped on the casting 76 as above described. Each shoe 126 has pivoted thereon a pawl 132 positioned for gravitational engagement at its outer end with a series of ratchet teeth 134 formed in the upper surface of the carrier beam 50, so that the shoe may be latched in position to press its dog 128 against the end of a short stud 131 and hold it while being nailed to a plate component as above described.

Figure 9:
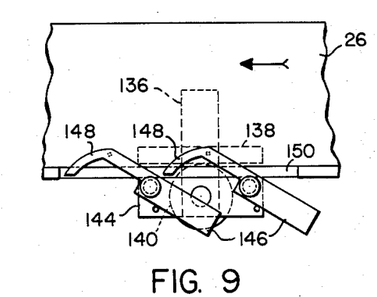
FIG. 9 is a fragmentary elevation of parts shown in FIG. 8 as viewed from the left.

To further clamp the frame components in position for nailing, each guideway beam 26 and 28 has fixed thereto a bracket 136 (FIGS. 8 and 9) including a plate 138 on which is mounted a fluid pressure cylinder 140. The reciprocating piston 142 of the cylinder slides through a bearing in bracket 136 and has fixed on its outer end a block 144 to which are pivotally pinned a pair of dogs 146. The dogs are weighted by construction to normally maintain the curved upper end 148 of each dog projecting above the bottom flange of guideway beam 26 which is cut away at 150 to clear the dogs. The rearwardly curved ends of the dogs and their normal outward position permit the frame plates 92 to be slid along their guideways for engagement with the stops 90, but operation of each cylinder 140 to retract its piston, moves the dogs laterally inward to engage and further clamp each frame plate against the upward flange of its guideway beam 26 or 28 while the plate and the stud are being nailed together, as hereafter described.

After each nailing and rearward movement of the carriage, to position it for attachment of an additional stud, the frame is anchored in its guideways while the carriage is being returned to position for adding and nailing an additional stud, and, for this purpose, each of the guideways 26, 28, 36 and 38 has means thereon for releasably engaging and holding the frame stationary during forward movement of the carriage. For this purpose each outer channel 46 of guideways 36 and 38 (FIGS. 12 and 13) has fixed thereon an angle bracket 152 between which the frame is further guided. Each bracket has fixed thereon a pair of spaced studs 154 supporting a plate 156 on which is mounted a fluid pressure cylinder 158 having a piston 160 formed with a pointed end 162 extending through an opening in the bracket for penetrating the material of the frame plate and holding it in position against return movement with the carriage.

The means for nailing the plates and studs together may have any known and suitable construction, such as disclosed in the patent to Morgan, No. 1,605,053, November 2, 1926, Nailing Machine. Thus, each opposite end of the carrier beam 50 has slidably mounted thereon a block 164 (FIGS. 2 and 3) on which a pair of overlapping plates 166 and 168 are fixed. Mounted on each plate is a nailing chuck, as 170, 172, of any known and suitable construction, having nail extrusion openings 174 and 176, respectively. The nails are fed to the chuck through flexible nail tubes 178 from a hopper at the side of the machine, of any known and suitable construction, such, for example, as disclosed in Morgan Patent No. 1,741,135, December 24, 1929, Nailing Machine.

Figure 2:
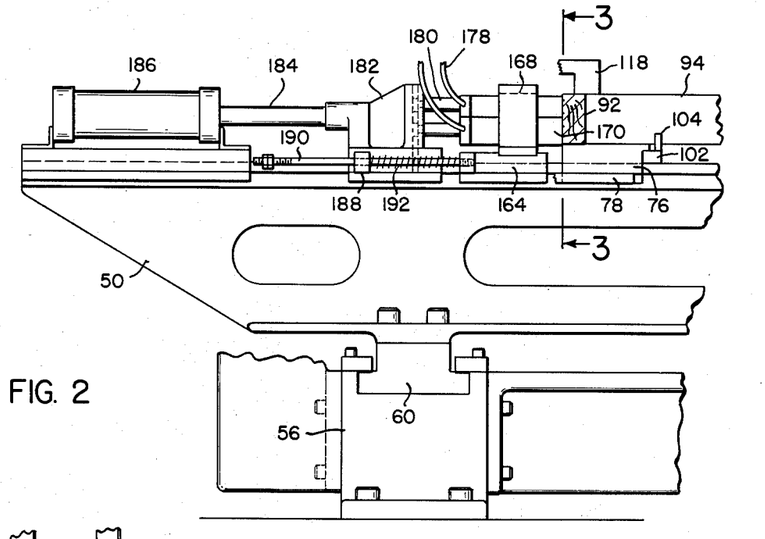
FIG. 2 is an enlarged elevation on the line 2—2 in FIG. 1, showing one end of the carriage beam and associated parts of the nailing mechanism.
Figure 3:
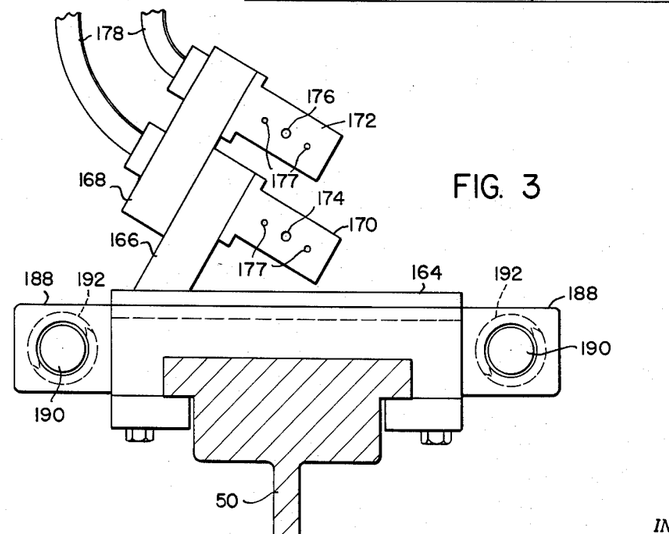
FIG. 3 is an enlarged elevation on the line 3—3 in FIG. 2.

Nails are driven from the pair of nail chucks by a pair of nailing pins 180 fixed in a driving head 182 fixed on the end of a piston 184 of a fluid pressure cylinder 186 mounted on the cross beam. Driving head 182 has oppositely extending lugs 188 formed with openings for sliding engagement, respectively, with a pair of rods 190. Each rod has one end fixed in the block 164 and carries a compression spring 192 between the block and the lug 188 of the driving head. Advancement of piston 184 serves to press the nailing chucks against the frame plate while the nailing pins 180 are moved to drive a pair of nails from the chucks through the plate into the stud. The chucks may be provided with pins to engage the frame plates and aid in drawing the frame along as the carrier beam is moved rearwardly.

Figure 16:
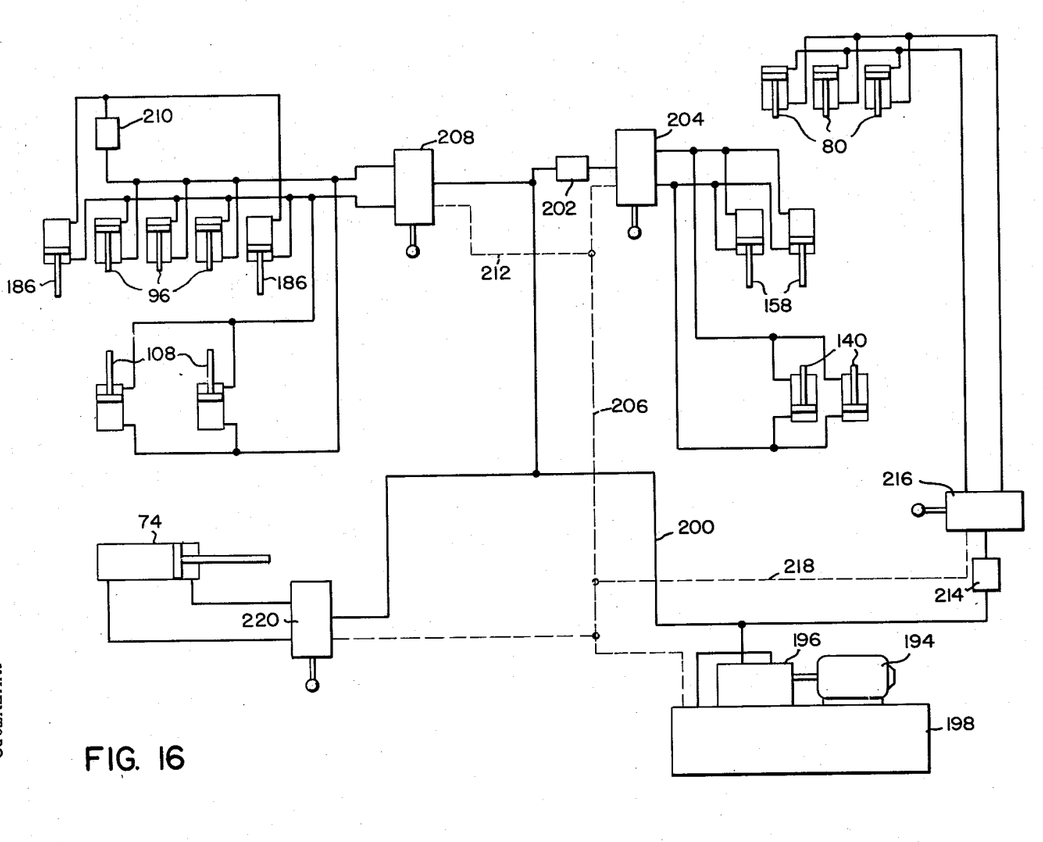
FIG. 16 is a schematic diagram of the fluid pressure operating system.

The fluid pressure system for operating the apparatus is shown schematically in FIG. 16, comprising a motor 194 connected to a pump 196. The pump may include a pressure chamber (not shown) and has its intake connected to a sump 198.

A pressure line 200 from the pump is connected through a pressure reducing valve 202, of any known or suitable construction, to a hand operated, four way valve 204, of any known and suitable construction, from which a line 206 discharges into the sump. Valve 204 is operable to connect each end of each cylinder 140 with pressure or relief to control operation of the clamping cylinders 140 (FIG. 8), for clamping the frame plates in guideways 26 and 28. Valve 204 similarly controls cylinders 158 (FIG. 12) for clamping the frames on guideways 36 and 38 during return of the carriage 50 to initial position.

Pressure line 200 is connected through a hand operated, four way valve 208 with each end of each of the cylinders 96 (FIG. 7) for clamping a strut against the stop 90 during the nailing operation. Valve 208 is connected also with each end of each of the cylinders 108 (FIGS. 6 and 7) for clamping and levelling the plates and studs. Valve 208 is connected also through a needle or other reducing valve 210, of any known or suitable construction, with both ends of cylinders 186 (FIG. 2), which operate the nail driving chucks 182, the reducing valve 210 serving to delay the driving of the nails until after the plates and studs have been precisely located and securely clamped in position. Valve 208 is connected by a line 212 with line 206 and the sump.

Pressure line 200 is connected through a pressure reducing valve 214 with a hand operated, four way valve 216 which is connected with each end of each of the cylinders 80 (FIGS. 6 and 7) for retracting the stops or gauges 90 to permit movement of the plates and studs. A line 218 connects the valve with line 206 leading to the sump.

Pressure line 200 is connected also through a hand operated, four way valve 220 with each end of cylinder 74 which moves carriage 50 backwardly and forwardly relative to its nailing position. While valves 204, 208, 216 and 220 have been described as hand operated, it is obvious that they can be replaced by solenoid operated valves in an electrical control circuit.

In operation, with the carriage 50 in nailing position (FIG. 1), the frame plates 92 are slid forwardly along their guideways 26 and 28 until their forward ends abut and are stopped by the gauges or stops 90 (FIGS. 6, 7 and 7-A). The dogs 146 yield by gravity to avoid obstruction of the plates and later serve to clamp the plates in the guideways under operation of the cylinders 140.

A stud 94 (FIGS. 6, 7 and 7-A) is then laid on the castings 76 against the positioning stops 90 with their ends abutting the inner sides of the frame plates 92. Cylinders 140 are operated to pull and clamp the plates 92 against the guideway flanges. The operation of valve 204 for this purpose also operates cylinders 158 which operate idly, however, until the end of the frame has advanced past their positions. Valve 208 is operated to actuate cylinders 96 on the carriage and pull the dogs 104 against the stud to clamp it against the stops 90 which are held raised by their springs 91. Cylinders 108 are similarly operated by the valve to swing the free ends of levers 116—118 down on the plates and studs to level them with each other. With the frame parts thus precisely assembled and firmly clamped together, cylinder 186 comes into delayed operation to operate the nailing heads and drive a pair of nails through each plate into the abutting ends of the stud. The nailing heads are provided with spurs 177 (FIG. 3) for additionally gripping the frame plates during rearward movement of the carriage with the frame, as will now be described.

The first stud having been nailed between the plates, valve 216 is operated to actuate cylinders 80 on the carriage (FIGS. 6 and 7) to retract the dogs 90. Valve 220 is operated to actuate the cylinder 74 on the stationary central pedestal of the apparatus to draw the plates 60 and the carrier beam 50 rearwardly through a distance equal to the predetermined spacing between adjacent studs. Such movement of the carriage pulls the frame along its guideways to position for the assembly of the next stud. In this position the stationary cylinders 140 and 158 are operated to grip and hold the frame stationary during movement of the carriage beam and its released clamps back to initial or nailing position. Such movement of the carriage beam is accomplished by operation of valve 220 to actuate cylinder 74 and its connected piston rod, gearing and plates 60 to which the carriage is connected. With the carriage thus returned to initial position, a second stud is laid on casting 76 and positioned, clamped and nailed as described above ready for repetition of the movement of the carriage and frame for the assembly of additional studs. The frame is thus assembled by step by step movements along its guideways until the desired number of studs have been assembled and nailed in the frame.

Where subordinate window or other interior frames are to be assembled, short studs are laid on the casting 76 and backed up by adjusting the shoes 126 (FIGS. 1, 10, 11) longitudinally of the carriage beam 50 so that the dogs 128 back up the ends of the short studs while being nailed to the plates. The interior frame is then inserted between the ends of the studs and nailed in place by hand. Dogs 126 are designed to swing by gravity to position for engagement with the studs 131 but may be latched down in lowered position by any suitable means.

The invention thus provides a more effective apparatus by which the several operations of assembling and fastening the components together are accomplished more automatically and completely by power operated means actuated by remote control devices, with the saving of time and of manual labor. The apparatus is readily adjustable to accommodate the construction of frames of different sizes and shapes and in which the frame parts are progressively moved by power operated means as the parts are assembled and fastened in place to accomplish maximum production with a minimum of manual labor. The construction of the apparatus throughout is practical in character and convenient to operate.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and scope of the appended claims.

We claim:

1. An apparatus for assembling and uniting structural frame components, comprising a supporting structure including means for supporting said frame components, members on said supporting structure for releasably positioning and holding said frame components relative to one another, devices on said supporting structure effecting relative movement between said positioning and holding members and said frame components and adapted to apply said members successively to successive assemblies of said components, means adapted for applying fastening means to said components for securing said components together, a carriage movable on said supporting structure and having said fastening means thereon and means for moving said carriage and actuating said members, devices and fastening means in succession to complete said frame.

2. An apparatus for assembling and uniting structural frame components comprising a supporting structure including means for supporting said frame components, a carriage movable on said supporting structure, members on said carriage for releasably positioning and holding said frame components relative to one another, devices on said carriage effecting relative movement between said positioning and holding members and said frame components and adapted to apply said members successively to successive assemblies of said components, means adapted for applying fastening means to said components for securing said components together and means for moving said carriage and for actuating said members, devices and fastening means in succession to complete said frame.

3. An apparatus for assembling and uniting structural frame components, comprising a supporting structure including means for supporting said frame components, a carriage movable on said supporting structure, members on said carriage for releasably positioning and holding said frame components relative to one another, devices on said carriage effecting relative movement between said positioning and holding members and said frame components and adapted to apply said members successively to successive assemblies of said components, means on said carriage adapted for applying fastening means to said components for securing said components together, means for moving said carriage variable distances to variably position the same on said supporting structure and means for actuating said members, devices and fastening means in succession to complete said frame.

4. An apparatus for assembling and uniting structural frame components comprising a supporting structure including spaced parallel guideways for supporting and guiding said frame components, means for releasably positioning and holding said components relative to one another, a carriage having means for engaging said components and movable along said guideways with and relative to said components for successive engagement therewith at different portions thereof, means adapted for applying fastening means to said components for securing said components together and means for moving said carriage and actuating said positioning and holding means in succession to complete said frame.

5. An apparatus for assembling and uniting structural frame components comprising a supporting structure including spaced parallel guideways for supporting and guiding frame components, means for adjusting said guideways toward and from each other to accommodate frame components of varying size, a carriage movable on said supporting structure in a direction substantially parallel with said guideways, members on said carriage in substantial alignment with said guideways, respectively, for releasably positioning and holding said frame components relative to one another, means for adjusting said members toward and from each other to accommodate components of varying sizes, devices on said carriage effecting relative movement between said positioning and holding members and said frame components and adapted to apply said members successively to successive assemblies of said components, means adapted for applying fastening means to said components for securing said components together and means for moving said carriage and for actuating said members, device and fastening means in succession to complete said frame.

6. Apparatus for assembling and uniting structural frame components, comprising a supporting structure including means for supporting said frame components, a carriage movable on said supporting structure, members on said carriage for releasably positioning and holding said frame components relative to one another, devices on said carriage effecting relative movement between said positioning and holding members and said frame components and adapted to apply said members successively to successive assemblies of said components, means adapted for applying fastening means to said components for securing said components together, means on said carriage for engaging and moving an assembly of said components on said supporting structure, means on said supporting structure for holding said frame components stationary during movement of said carriage for successive engagements of said carriage with said components, and means for moving said carriage and actuating said members, devices and fastening means in succession to complete said frame.

7. An apparatus for assembling and uniting structural frame components, comprising a supporting structure including spaced parallel guideways for supporting said components, a carriage having a reciprocating movement on said supporting structure parallel with said guideways, members on said carriage for releasably positioning and holding said frame components relative to one another, devices on said carriage effecting relative movement between said positioning and holding members and said frame components and adapted to apply said members successively to successive assemblies of said components, means adapted for applying fastening means to said components for securing said components together and means for reciprocating said carriage and for actuating said members, devices and fastening means to complete said frame.

8. An apparatus as claimed in claim 7 comprising means on said carriage for engaging and moving said components in one direction of movement of said carriage and means on said supporting means for engaging and holding said components stationary during movement of said carriage in the opposite direction.

9. An apparatus as claimed in claim 7 in which said carriage includes an elongated structural element extending traneversely of said guideways and provided with means for supporting the same on said supporting structure for movement parallel with said guideways.

10. Apparatus for assembling and uniting structural frame components comprising a supporting structure including means for supporting said frame components, a carriage movable on said supporting structure, means on said carriage for releasably positioning and holding said frame components relative to one another, means on said carriage adapted for applying fastening means to said components for securing said components together to form said frame and power operated means for moving said carriage on said supporting structure and concomitantly moving said components to successive positions for progressively assembling and fastening said components together in predetermined relative position.

11. An apparatus as specified in claim 10 in which said carriage has a reciprocating movement on said supporting structure.

12. An apparatus as specified in claim 10 comprising means for varying the extent of movement of said carriage to variably position the same on said support structure.

13. An apparatus as specified in claim 10 in which said power operated means is a fluid pressure system including means for moving said carriage and for actuating said positioning and holding means and said fastening means separately and in succession.

14. An apparatus for assembling and uniting longitudinal and transverse structural frame components comprising a supporting structure including means for supporting said frame components and means for guiding said longitudinal components for longitudinal movement, a carriage having a reciprocating movement on said supporting structure parallel with said guide means, means on said carriage for releasably positioning and holding said frame components relative to one another, means on said carriage for levelling with one another the flush surfaces of said frame components lying in different planes, means on said carriage for nailing said frame components together to form said frame and power operated means for reciprocating said carriage on said supporting structure and concomitantly advancing said components to successive positions for progressively assembling and fastening said components together in predetermined relative positions.

References Cited in the file of this patent
UNITED STATES PATENTS
1,909,451    Breece _______________ May 16, 1933